United States Patent [19]

Firester

[11] 4,033,665
[45] July 5, 1977

[54] SYSTEM FOR RECORDING REDUNDANT FOURIER-TRANSFORM HOLOGRAM

[75] Inventor: Arthur Herbert Firester, Skillman, N.J.

[73] Assignee: RCA Corporation, New York, N.Y.

[22] Filed: May 27, 1976

[21] Appl. No.: 690,653

Related U.S. Application Data

[63] Continuation-in-part of Ser. No. 582,427, May 30, 1975, abandoned, which is a continuation of Ser. No. 490,501, July 22, 1974, abandoned.

[52] U.S. Cl. .................................................. 350/3.5
[51] Int. Cl.² .................. G03H 1/28; G03H 1/16
[58] Field of Search ................................... 350/3.5

[56] References Cited

UNITED STATES PATENTS 3,677,616  7/1972  Lewis .................. 350/3.5
3,838,904  10/1974  Matsumura et al. .............. 350/3.5

OTHER PUBLICATIONS

Tsunoda et al., J. Appl. Phys., vol. 44, No. 5, May, 1973, pp. 2422–2423.

Primary Examiner—John K. Corbin
Assistant Examiner—Jon W. Henry
Attorney, Agent, or Firm—H. Christoffersen; Samuel Cohen; George J. Seligsohn

[57] ABSTRACT

System employs pinhole array in conjunction with a random phase shift plate for recording a redundant Fourier-transform hologram of a two-dimensional object that exhibits a gray scale.

3 Claims, 2 Drawing Figures

4,033,665

SYSTEM FOR RECORDING REDUNDANT FOURIER-TRANSFORM HOLOGRAM

This is a continuation-in-part of application Ser. No. 582,427, filed May 30, 1975, now abandoned which, in turn, was a continuation of application Ser. No. 490,501, filed July 22, 1974, now abandoned.

This invention relates to a system for recording holograms and, more particularly, to such a system for recording a redundant Fourier-transform hologram of a two-dimensional object that exhibits a gray scale.

STATE OF THE ART

Reference is made to U.S. Pat. No. 3,689,129, issued to M. J. Lurie on Sept. 5, 1972, which discloses a system employing a pinhole array for recording a high resolution redundant hologram of a two-dimensional object which may exhibit a gray scale. Reference is also made to the article "Use of a Random Phase Mask for Recording of Fourier Transform Holograms of Data Masks," by C. B. Burckhart, appearing on page 694 of the March 1970, Volume 9, No. 3, issue of *APPLIED OPTICS*, which discloses a system for recording a non-redundant Fourier transform hologram of binary data bits distributed on a data mask. In addition, reference is made to the article "High-Density Image-Storage Holograms by Sampling and Random Phase Shifter Method" by Y. Tsunoda et al, appearing on page 2422 of the May 1973, Volume 44, No. 5 issue of the Journal of Applied Physics which discloses a system for recording a non-redundant, refraction-limited hologram of an object exhibiting a gray scale.

This latter system is similar to the system disclosed in the Burckhart article to the extent that it also employs a random phase mask for preventing concentration of light in bright "spikes" which would otherwise result from the illumination of a regularly-spaced array of data bits with coherent wave energy. However, the latter reference differs from the Burckhart reference by substituting a two-dimensional object exhibiting a gray scale which is divided into a large number of sampled portions by a sampling mesh with many holes for the binary data mask employed by Burckhart. In the latter reference, it is the sampling mesh with many holes that provides the regularly-spaced array, rather than the distribution of the binary data bits in Burckhart's data mask. Furthermore, in the system disclosed in the Tsunoda et al. article in order to obtain the desired non-redundant, diffraction-limited hologram, the size of the holes in the sampling mesh must be relatively large, such as 40 micrometers in the specific example given in this article, so that substantially no divergence occurs of the zero diffraction order (Airy disk) 0.488 micrometer wavelength light emerging therefrom.

SUMMARY OF THE INVENTION

The system of the present invention records a redundant, Fourier-transform hologram of a two-dimensional object that exhibits a gray scale, the hologram being recorded on a given area of a recording medium with mutually coherent reference and information beams of wave energy of a given wavelength. The system comprises illuminating means including an encoding mask positioned to simultaneously illuminate each one of respective sampled portions of the object with a corresponding one of divergent sampling components of coherent wave energy of the given wavelength. The system further includes Fourier-transform means including a lens having at least a given diameter and a given focal length. The lens has the object in its front focal plane and the recording medium in its back focal plane so that substantially all of the given area of the recording medium is illuminated with the information beam in response to substantially the area of the lens defined by the given diameter simultaneously illuminated by all the divergent sampling components. Further, the encoding mask includes an amplitude mask in association with the phase plate, in which the amplitude mask comprises a substantially regular array of apertures, each of which is significantly smaller than 40 micrometers. In particular, each aperture has a predetermined shape of a sufficiently small size with respect to the given wavelength to diffract coherent wave energy incident thereon so that the zero diffraction order (Airy disk) of the wave energy passing through that individual aperture exhibits a preselected angle of divergence which subtends the aforesaid given diameter at the principal plane of the lens. Thus, substantially the entire lens area defined by the given diameter is simultaneously illuminated by the zero diffraction order divergent sampling component emerging from each respective aperture of the array. The phase plate of the encoding mask includes a sampling area individually corresponding to the apertures of the array to provide a uniform phase shift for any single sampling component which bears a random phase relationship with the uniform phase shift provided for any other sampling component so that for the aperture corresponding to each sampling component there exists another randomly-located aperture corresponding to a sampling component substantially 180° out of phase therewith. This causes the average amplitude transmittance of the entire encoding mask to be substantially zero.

FIG. 1 is a diagrammatic showing of a preferred embodiment of the hologram recording system of the present invention, and FIG. 2 illustrates an embodiment of the encoding mask employed in FIG. 1.

DETAILED DESCRIPTION

Figure 1:
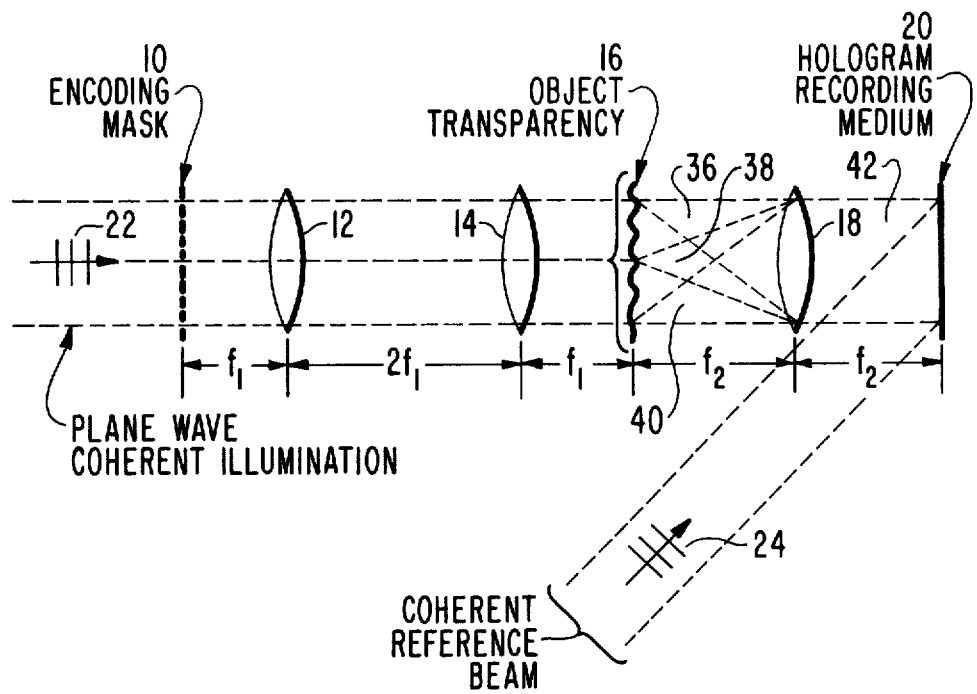

Referring now to FIG. 1, there is shown encoding mask 10, first lens 12, second lens 14, object transparency 16, third lens 18 and hologram recording medium 20. As shown, each of first lens 12 and second lens 14 has a first focal length $f_1$ and third lens 18 has a second focal length $f_2$. First and second lenses 12 and 14 are spaced from each other by a distance equal to twice the first focal length, i.e. $2f_1$. Third lens 18 is oriented in substantially coaxial relationship with first and second lenses 12 and 14 and is situated on the other side of second lens 14 from first lens 12 at a distance from second lens 14 equal to the sum of the first and second focal lengths, i.e. $f_1 + f_2$.

Object transparency 16, which may be a slide or a frame of a motion picture depicting a given scene having a gray scale, is situated between second lens 14 and third lens 18 at a distance equal to first focal length $f_1$ from second lens 14 and at a distance equal to the second focal length $f_2$ from third lens 18.

On the other side of third lens 18 from second lens 14 and at a distance therefrom equal to the second focal length $f_2$ is hologram recording medium 20. On the other side of first lens 12 from second lens 14 and at a distance therefrom equal to first focal length $f_1$ is encoding mask 10.

This arrangement of encoding mask 10, first lens 12, second lens 14, object transparency 16, third lens 18 and hologram recording means 20 is illuminated by a plane wave of coherent wave energy 22 having a given wavelength. Hologram recording medium 20 is also directly illuminated by coherent reference beam 24 of wave energy of the given wavelength which is mutually coherent with the wave energy of plane wave coherent illumination 22. Plane wave coherent illumination 22 and coherent reference beam 24 may be obtained from the combination of a laser emitting coherent wave energy of this given wavelength together with a beam splitter and other suitable optics known and conventionally employed in recording holograms.

Figure 2:
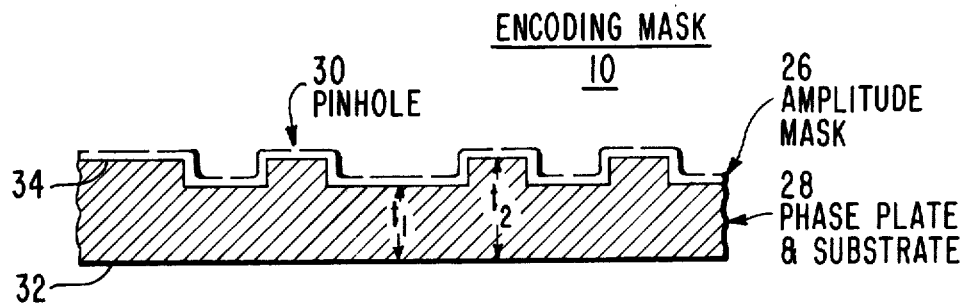

As shown in FIG. 2, encoding mask 10 may be composed of amplitude mask 26 backed by a substrate forming phase plate 28. (Alternatively, amplitude mask 26 could be situated in front of phase plate 28.) Amplitude mask 26 is composed of an opaque layer having a regularly-spaced, two-dimensional array of pinholes, such as pinhole 30, therein. The cross sectional dimensions (diameter) of each individual pinhole 30 in amplitude mask 26 is sufficiently small compared to the wavelength of the coherent wave energy to produce a preselected divergence of the zero diffraction order (Airy disk) emerging therefrom. For instance, with coherent wave energy (632.8 nm) from a He-Ne laser, each pinhole may have a diameter of 3 micrometers.

The substrate of phase plate 28 is substantially optically transparent and has a predetermined index of refraction which is different from its surroundings. Bottom face 32 of substrate 28 is substantially flat, while top face 34 of substrate 28 is divided into a plurality of contiguous sampling areas each of which is substantially parallel to bottom face 32. Substrate 28 has a thickness between bottom face 32 and any one sampling area which has either a first given value (such as $t_1$) or a second given value (such as $t_2$) which differs from the first given value by substantially an odd number of half-wavelengths of wave energy 22. The size of the individual contiguous sampling areas is determined by the regular spacing between the pinholes of amplitude mask 26 so that a separate single pinhole of amplitude mask 26 is in cooperative relationship with each respective one of the sampling areas. While the spatial locations of those sampling areas of face plate 28 associated with the first given value (such as $t_1$) are randomly distributed with respect to the respective locations of those sampling areas associated with the second given value (such as $t_2$), substantially one-half of the entire set of sampling areas is associated with the first given value (such as $t_1$) and the remaining substantially one-half of the sampling areas is associated with the second given value (such as $t_2$). This results in the average amplitude transmitted to the entire encoding mask being substantially zero. Although for simplicity in disclosure, only two given values ($t_1$ and $t_2$) are shown; in practice three or more given values may be employed, so long as the average amplitude transmitted remains substantially zero.

Encoding mask 10, as shown in FIG. 2, might, if desired, be made similar to the combination of random phase shifter and sampling mask disclosed in the aforesaid Tsunoda et al. article in certain respects, such as by providing 1000 × 1000 sampling areas, if this is desired, or by providing a sampling × area dimension of 50 micrometers, if this is desired. However, the size of each pinhole, such as pinhole 30, in amplitude mask 26 of encoding mask 10 must be made much smaller (e.g. 3 micrometers) than the relatively large size of 40 micrometers specified for the holes of the sampling mesh in the aforesaid Tsunoda et al article.

In particular, in the system disclosed in the Tsunoda et al. article, the relatively large 40 micrometer holes in the sampling mesh provide a relatively negligible amount of diffraction at the argon laser recording wavelength of 0.488 micrometers. It is this fact that enables the relatively small diffraction-limited hologram size dimension of two millimeters to be achieved by Tsunoda et al. with a Fourier-transform lens of F/1.4.

It is essential to applicant's invention, however, that the size of the pinholes, such as pinhole 30, in amplitude mask 26 of FIG. 2 be sufficiently small to provide a relatively large amount of diffraction of the wave energy emerging therefrom in order to record a redundant, non-diffraction-limited hologram which is relatively large compared to the size of a diffraction-limited hologram.

Considering now the operation of the arrangement shown in FIG. 1, encoding mask 10, as shown in FIG. 2 is positioned in FIG. 1 with face 32 at the left thereof and amplitude mask 26 at the right thereof, so that wave energy 22 is incident on face 32 and emerges from the pinholes, such as pinhole 30, in amplitude mask 26. The presence of first lens 12 and second lens 14, positioned as shown in FIG. 1, results in an image of amplitude mask 26 being substantially coincident with object transparency 16. For the purposes of the present invention, first and second lenses 12 and 14 could be dispensed with and encoding mask 10 could be positioned directly in contact with object transparency 16, although such an arrangement would be much less practical than the arrangement shown in FIG. 1.

The effect, in any case, is for a separate spatial portion of a given scene manifested by object transparency 16 to be sampled by light wave energy corresponding to a specific one of the pinholes, such as pinhole 30, of amplitude mask 26. Due to the diffraction provided by the small size (e.g. 3 micrometers) of each of the pinholes, each one of the sampled portions of object transparency 16 gives rise to a separate diverging sample beam component, such as sample beam components 36, 38 and 40, each of which is sufficiently wide in the plane of Fourier-transform third lens 18 to entirely illuminate all of lens 18. Thus, substantially, the entire area of third lens 18 is simultaneously illuminated by all the zero diffraction order sample beam components, such as sample beam components 36, 38 and 40. The positioning of third lens 18 is such as to transform all the respective point-source, diverging sampling component beams, such as beams 36, 38 and 40, into substantially coincident, overlapping parallel components of resultant information beam 42. Resultant information beam 42 is incident on a given area of a given shape of hologram recording medium 20, which is also illuminated with coherent reference beam 24. This results in the recording of a redundant hologram of the given gray-scale scene depicted by object transparency 16 on this given area of hologram recording means 20.

The given area of hologram recording means 20 is relatively large compared to the size a diffraction-limited hologram would have. For example, a typical dimension of the given area of a recorded hologram recording medium 20 would be between ¼ inch and ½ inch, rather than only about 2 millimeters.

Because the openings in amplitude mask 26 need not be round, but may have any desired shape, the generic term "aperture" is employed in the claims, rather than the more specific term "pinhole."

What is claimed is:

1. A system for recording a redundant Fourier-transform hologram of a two-dimensional object that exhibits a gray scale, said hologram being recorded on a given area of a recording medium with mutually coherent reference and information beams of wave energy of a given wavelength, said system comprising:
   a. illuminating means including an encoding mask positioned to simultaneously illuminate each one of respective sampled portions of said object with a corresponding one of divergent sampling components of coherent wave energy of said given wavelength,
   b. Fourier-transform means including a lens having at least a given diameter and a given focal length, said lens having said object in its front focal plane and said recording medium in its back focal plane for illuminating substantially all of said given area with said information beam in response to substantially the area of said lens defined by said given diameter being simultaneously illuminated by all said divergent sampling components, and
   c. wherein said encoding mask includes an amplitude mask in association with a phase plate, said amplitude mask comprising a substantially regular array of apertures for deriving from each aperture a separate one of said divergent sampling components, each aperture having a predetermined shape of a predetermined size with respect to said given wavelength which is sufficiently small to diffract coherent wave energy incident thereon so that the zero diffraction order of the wave energy passing therethrough exhibits a preselected angle of divergence which subtends said given diameter at the principal plane of said lens, whereby substantially said entire lens area defined by said given diameter is simultaneously illuminated by the zero diffraction order divergent sampling component emerging from each respective aperture of said array, and wherein said phase plate includes sampling area individually corresponding to said apertures of said array to provide a uniform phase shift for any single sampling component which bears a random phase relationship with the uniform phase shift provided for any other sampling component so that for the aperture corresponding to each sampling component there exists another randomly-located aperture corresponding to a sampling component substantially 180° out of phase therewith, whereby the average amplitude transmittance of the entire encoding mask is substantially zero.

2. The system defined in claim 1, wherein said two-dimensional object comprises an object transparency, and wherein said illuminating means further comprises first and second lenses each having substantially the same focal length and spaced from each other by substantially twice said focal length thereof so that the back focal plane of said first lens substantially coincides with the front focal plane of said second lens, said object transparency being situated substantially in the back focal plane of said second lens, whereby said back focal plane of said second lens substantially coincides with the front focal plane of said Fourier-transform lens, and said encoding mask being situated substantially in the front focal plane of said first lens, whereby in response to said encoding mask being illuminated with plane wave coherent illumination an image of said regular array of apertures is derived substantially in coincidence with said object transparency.

3. The system defined in claim 1, wherein said phase plate comprises a substantially optically transparent substrate having a predetermined index of refraction which is different from its surroundings, one face of said substrate being substantially flat and the other face of said substrate being divided into a plurality of contiguous sampling areas each of which is substantially parallel to said one face, said substrate having a thickness between said one face thereof and any one sampling area which has either a first given value or a second given value which differs from said first given value by substantially an odd number of half-wavelengths of said wave energy, and wherein said amplitude mask covers said other face of said substrate and has a separate single aperture thereof in cooperative spatial relationship with each of said sampling areas to illuminate each respective one of said sampling areas with wave energy from a separate aperture.

* * * * *